(12) United States Patent
Boyer et al.

(10) Patent No.: US 8,163,046 B2
(45) Date of Patent: *Apr. 24, 2012

(54) START-UP PROCESS FOR A UNIT FOR PRODUCING HIGHLY THERMALLY-INTEGRATED HYDROGEN BY REFORMING A HYDROCARBON FEEDSTOCK

(75) Inventors: Christophe Boyer, Charly (FR); Fabrice Giroudiere, Orlienas (FR); Stéphane Bertholin, Ste Foy les Lyon (FR); Aziz Sattar, West Chicago, IL (US)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 992 days.

This patent is subject to a terminal disclaimer.

(21) Appl. No.: 12/057,897

(22) Filed: Mar. 28, 2008

(65) Prior Publication Data
US 2009/0241419 A1 Oct. 1, 2009

(51) Int. Cl.
*B01J 7/00* (2006.01)
*B01J 8/00* (2006.01)
*C01B 3/36* (2006.01)
*C01B 6/24* (2006.01)
*C01B 3/02* (2006.01)
*C10J 3/54* (2006.01)

(52) U.S. Cl. ....... 48/197 R; 48/61; 423/644; 423/648.1; 422/625

(58) Field of Classification Search ................. 48/197 R
See application file for complete search history.

(56) References Cited

U.S. PATENT DOCUMENTS

| | | | |
|---|---|---|---|
| 6,416,893 B1 * | 7/2002 | Clingerman et al. | 429/416 |
| 2002/0045078 A1 * | 4/2002 | Kawasumi et al. | 429/20 |
| 2002/0078628 A1 * | 6/2002 | Okada et al. | 48/76 |
| 2002/0081469 A1 * | 6/2002 | Nomura et al. | 429/19 |
| 2002/0146604 A1 * | 10/2002 | Matoba | 429/20 |
| 2002/0152681 A1 * | 10/2002 | Oh et al. | 48/127.9 |
| 2003/0072978 A1 * | 4/2003 | Meyer et al. | 429/13 |
| 2004/0048123 A1 * | 3/2004 | Kelly et al. | 429/26 |
| 2004/0101720 A1 * | 5/2004 | Ogawa | 429/20 |
| 2004/0224196 A1 * | 11/2004 | Pastula et al. | 429/20 |
| 2005/0271924 A1 * | 12/2005 | Coors et al. | 429/34 |
| 2007/0096742 A1 * | 5/2007 | Alger et al. | 324/393 |

* cited by examiner

Primary Examiner — Matthew Merkling
(74) Attorney, Agent, or Firm — Millen, White, Zelano & Branigan, P.C.

(57) ABSTRACT

The invention relates to a start-up process for a unit for producing highly thermally-integrated hydrogen by reforming a hydrocarbon feedstock that comprises a stage a wherein a burner whose purpose is to ensure start-up is supplied with a mixture of hydrocarbon feedstock and air, a stage b wherein a water stream is evaporated by indirect heat exchange with at least one of the hot streams of the process, a stage c wherein the hydrocarbon feedstock to be reformed is evaporated and heated and then introduced in gaseous form in a reforming reactor, and a stage d wherein the start-up burner is shut down, and a burner that is in permanent operation is lit.

13 Claims, 1 Drawing Sheet

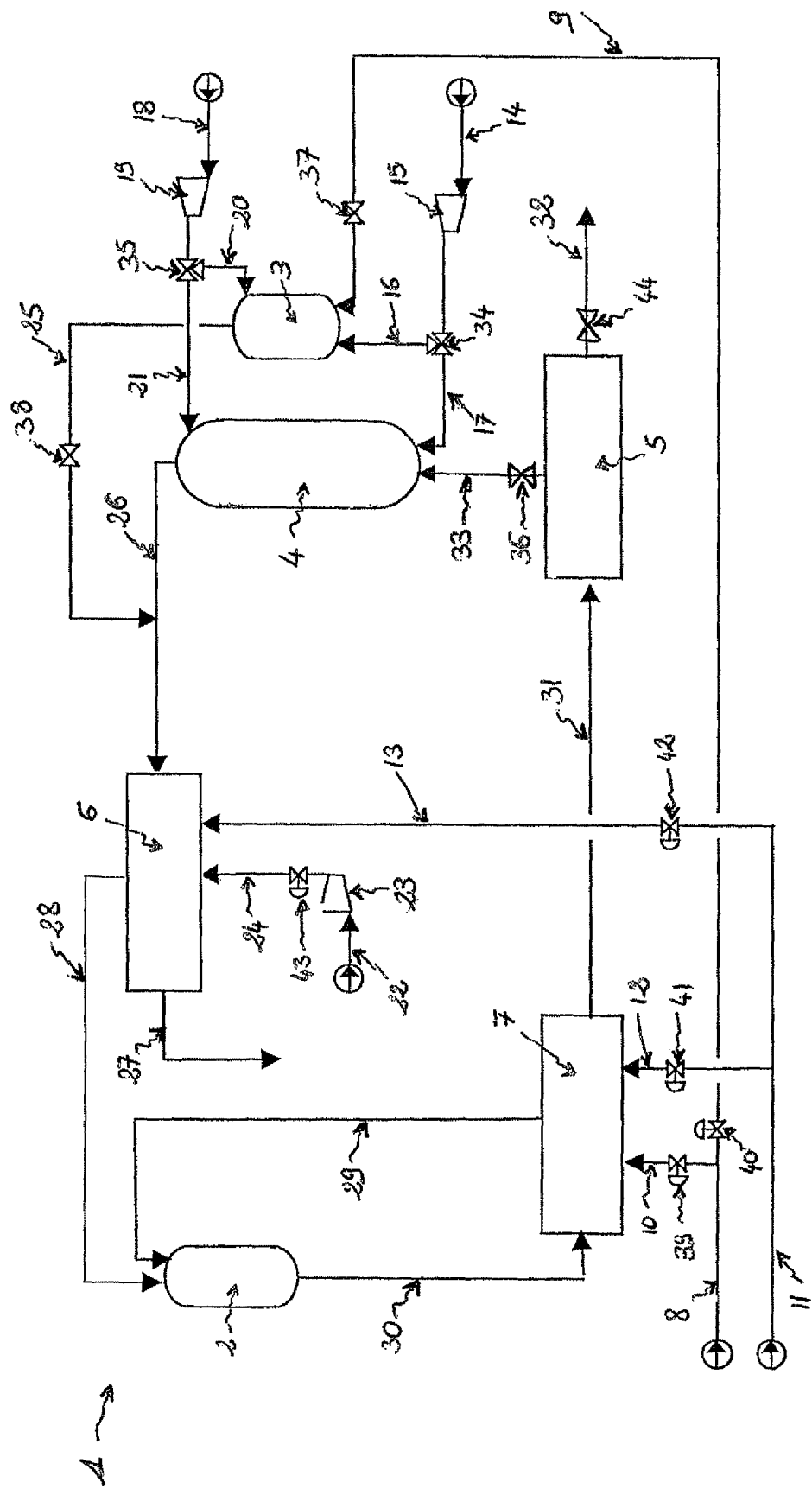

START-UP PROCESS FOR A UNIT FOR PRODUCING HIGHLY THERMALLY-INTEGRATED HYDROGEN BY REFORMING A HYDROCARBON FEEDSTOCK

FIELD OF THE INVENTION

The invention relates to the field of the production of hydrogen by reforming a hydrocarbon feedstock.

The hydrogen is used as a raw material in numerous chemical applications. It is an alternative fuel, which makes it possible to supply, for example, fuel cells. The latter have become an absolute necessity in this field because they provide a possible response to the production of non-polluting energy.

Various processes are used for the production of hydrogen from hydrocarbon fuel:

Partial oxidation (POX for partial oxidation according to the English terminology) is a very often catalyzed exothermic reaction that produces hydrogen ($H_2$) by reaction between the feedstock and the oxygen ($O_2$) that is contained in, for example, air:

In the case of methane, for example: $CH_4 + \frac{1}{2}O_2 \rightarrow CO + 2 H_2$ This reaction is to differentiate the following from the total oxidation (TOX for total oxidation) that does not produce hydrogen:

In the case of methane, for example: $CH_4 + 2O_2 \rightarrow CO_2 + 2 H_2O$

Vapor Reforming (SMR for steam reforming according to the English terminology) is an also catalytic endothermic reaction that produces hydrogen by reaction of the feedstock with water ($H_2O$):

In the case of methane, for example: $CH_4 + H_2O \rightarrow CO + 3 H_2$

The autothermal reforming (ATR for autothermal reforming according to the English terminology) is the coupling of the partial oxidation reaction and vapor reforming.

Whereby the exothermicity of the partial oxidation compensates for the endothermicity of the vapor reforming, an autothermal reformer can be adiabatic, apart from the heat losses. This operating mode is therefore important for the management of energy.

The vapor reforming or the autothermal reforming are preferred within the scope of the invention because they result in a synthesis gas (mixture of carbon monoxide (CO), carbon dioxide ($CO_2$) and hydrogen ($H_2$)) that is richer in hydrogen than the partial oxidation.

At the outlet of a reforming unit, the hydrogen-rich effluent gas contains many impurities, in particular carbon monoxide (CO). The latter is particularly troublesome because it poisons the catalyst of the cells. It is for this purpose that a purification section is generally installed to extract the pure hydrogen.

In the following description, the term purification is used for any means allowing to enrich in hydrogen a gas already containing hydrogen, or to convert some impurities, or further to eliminate some impurities (such as carbon monoxide for example) eventually present in said gas. Such means may for example be the P1 to P4 means described thereafter. These means can be used alone or eventually in combination, especially when the hydrogen purity looked for is very high.

P1) It is known that the level of carbon monoxide can be reduced by using the reaction for converting carbon monoxide into water (WGS for water gas shift reaction according to the English terminology).

In this reaction, the water vapor that is used may be that which is present in excess in the effluent or else the water vapor that is added to the reformate. It requires the use of a suitable catalyst. At the outlet of a reactor for converting carbon monoxide into water, the molar percentage of carbon monoxide (CO) is about 0.5 or higher. The effluent also contains water and carbon dioxide ($CO_2$). According to the degree of purity that the user wishes to obtain, it may be suitable to use an additional purification means.

P2) One possibility is to use alone, or in combination for example with means P1, a system for purification by adsorption (adsorption process by pressure variation or PSA for pressure swing adsorption according to the English terminology). This technology makes it possible to obtain hydrogen of very high purity (higher by 99.9% by volume) from a reformate after conversion of the carbon monoxide. The PSA is based on the principle of adsorption of the impurities in molecular sieve beds. The regeneration is obtained by expansion of the adsorption bed and flushing by an internal purge gas. The continuity of the system is ensured by the concurrent installation of several tanks.

P3) Another possibility consists in a reaction of preferred oxidation (PrOx for preferential oxidation according to the English terminology).

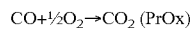

This reaction is conducted in a reactor that contains a suitable catalyst at a temperature that promotes the oxidation of the carbon monoxide with the oxygen of the air in the presence of hydrogen but without consuming or oxidizing substantial amounts of hydrogen nor leading to the inverse reaction of the conversion of carbon monoxide into water (RWGS for Reverse Water Gas Shift in English terminology).

P4) A membrane purification is also a system that is used frequently to eliminate impurities from a hydrogen rich gas, especially when the purity of the hydrogen looked for is very high (e.g. higher than 99 vol. % or higher than 99.5 vol. %).

The large-scale hydrogen production processes are used primarily in industries that require pure hydrogen for certain chemical operations, or in the provisioning of stationary fuel cells. The advantage of these large installations is the possibility of maximizing the hydrogen yield by integrating very strongly and in a complex way all of the units of the installation. It is also possible to use expensive construction materials that are resistant to very high temperatures. The small-scale processes for the production of pure hydrogen are a response to the problem of transport and storage of hydrogen. Small units, less costly and more mobile, make it possible to have a hydrogen source that is close to the installation that requires it.

A fuel in liquid form, such as, for example, ethanol, is easier to manipulate for a user than a gaseous feedstock. However, the use of a liquid feedstock poses the additional problem of the evaporation of this feedstock. Actually, before entering the autothermal reformer, the feedstock is to be in vapor form and mixed with water vapor and air. The process is therefore, on the one hand, to evaporate the liquid feedstock, and, on the other hand, to produce the water vapor that is necessary to the reaction. It is difficult under these conditions to design a totally autothermal process without thereby reducing the yield of pure hydrogen of the installation.

The demand for hydrogen, primarily for the small units, may fluctuate. As a result, it is better that the generator can be shut down and restarted frequently. One additional difficulty is therefore the implementation of a start-up procedure that is quick and high-performing, while remaining economical.

Prior Art

The problem of the quick start-up of an installation for the production of hydrogen was already studied in the prior art. Globally, two principles were put forward: either it is the feedstock itself that is heated directly or indirectly before entering the reformer, or it is the reactor and its catalytic bed that are heated prior to the introduction of the feedstock that is to be reformed.

According to the first solution, the U.S. Pat. No. 4,788,004 proposes using a burner for the start-up phase of a reforming process. The latter, burning a suitable fuel, produces enough heat to heat, directly or indirectly, the reagents of the reforming reaction up to their self-ignition temperature.

The Patent Application US 2003/0154654 proposes facilitating the quick start-up of small hydrogen production units coupled to a fuel cell by evaporating the water directly in a burner and not by indirect heat exchange with a hot effluent.

According to the second solution, the Patent Application US 2003/0019156 proposes—to accelerate the start-up of the units for reforming hydrocarbon feedstocks—preheating the reforming reactor using air at a temperature that is sufficient for the reforming catalyst to oxidize. In this way, the catalyst generates its own heat, which, added to the heat of the air, accelerates the preheating of the reactor.

The Patent Application WO 2005/090230 unveils a start-up process of a hydrogen production unit that begins with the heating of the reforming reactor as well as another downstream unit using a hot oxygen-rich gas. This method is intended for the reforming of gaseous, typically hydrocarbon feedstock under the reforming conditions.

The method for conducting a reforming system discovered in the U.S. Pat. No. 6,521,204 contains a quick start-up process that consists in the use of a mixture of hydrocarbon feedstock and air that is low in hydrocarbon feedstock. This mixture reacts on the catalyst of the reforming reactor by producing heat while minimizing the formation of carbon.

To heat quickly the reforming reactor as well as the other units of the process for producing reformed gas, the inventors of the German Patent Application DE 10 2004 001 310 A1 carry out in a first step a total oxidation on the reforming catalyst of the gaseous hydrocarbon feedstock mixed with smoke that exits from a burner.

The thermal integration is improved when the two solutions are combined. Thus, the Patent Application US 2003/0093950 describes an integrated energy production system by reforming a fuel and use of a thermally-integrated fuel cell. So that the system, upon start-up, quickly attains the temperature necessary to its operation, while minimizing its electric energy consumption, two burners operate at the same time, one to heat the reforming reactor, and the other to evaporate the water and heat the other units downstream from the reformer.

The U.S. Pat. No. 6,635,372 studies more particularly the use of liquid hydrocarbon feedstocks. For the start-up phase, the process uses a gaseous fraction, which evaporated during a preceding usage and which was stored in adsorbed form. During the start-up, these vapors are desorbed and are burned with air. The hot effluents are designed to heat the reforming reactor quickly.

SUMMARY DESCRIPTION OF THE INVENTION

The invention relates to a start-up process for a thermally-integrated hydrogen production unit that comprises:

A stage a wherein a burner whose purpose is to ensure start-up of the unit is supplied with a mixture of hydrocarbon feedstock and air, whereby said mixture is burned, and the hot effluents that are obtained from said burner heat a gaseous stream that enters a reforming reactor and that exits therefrom, until the temperature of the stream that is obtained from said reforming reactor reaches a value of more than 200° C.;

A stage b that is initiated after stage a, wherein a stream of water is evaporated by indirect heat exchange with at least one of the hot streams of the process, generating a stream of water vapor that enters said reforming reactor until the stream that is obtained from this reactor reaches a temperature of more than 300° C. and all of the water is evaporated;

A stage c that is initiated after stage b, wherein the hydrocarbon feedstock that is to be reformed is evaporated when it is a liquid feedstock, or heated when it is a gaseous feedstock, by indirect heat exchange with at least one of the hot streams of the process; said feedstock is then introduced into the reforming reactor, which makes possible the production of a hydrogen-rich effluent stream;

A stage d that is initiated after stage c, wherein the start-up burner is shut down, and, in its place, a burner that is in permanent operation is lit, whereby said burner is supplied by a mixture of residual air and gas discharged by a section for purification of the hydrogen-rich stream.

Preferably, the hydrocarbon feedstock to be reformed is liquid. The start-up burner in this preferred case has a technology that is suitable for the combustion of a liquid feedstock.

SUMMARY DESCRIPTION OF THE FIGURES

FIG. 1 is a process diagram that shows an installation variant for reforming a hydrocarbon feedstock whose start-up is carried out according to the invention.

DETAILED DESCRIPTION OF THE INVENTION

A. Description of the Process for Producing Hydrogen:

The invention is suitable for reforming hydrocarbon feedstocks. It may involve hydrocarbons, petroleum fractions or alcohols, such as, for example, ethanol, or finally mixtures of the latter. Preferably, the hydrocarbon feedstock that is to be reformed is liquid. A potentially advantageous fuel is bioethanol. This biofuel is presented as a long-lasting energy alternative. It is obtained by fermentation or distillation of vegetable raw materials, such as, for example, saccharose or starch. It has the advantage of having a very low level of greenhouse gas emissions.

Certain feedstocks can contain sulfur-containing compounds or odorous compounds that are added as required by law. For example, by adding methanol or gasoline, the denaturation of the ethanol makes it possible to make it unsuitable for human consumption and thus to prevent any customs trading, whereby the fees for the alcohol intended for human consumption and for the chemical industry are not the same. However, these chemical compounds can deteriorate the catalysts that are present in the installation. It is therefore useful for one skilled in the art to purify the feedstock before its use, by using, for example, a desulfurization unit.

In addition to the hydrocarbon feedstock, the process requires a supply of water. The latter is preferably deionized. In the case where the reforming reaction is autothermal reforming, an oxygen source is necessary to the reaction. The latter can be pure oxygen, air, or oxygen-enriched air.

The reforming process is implemented by one skilled in the art from among the known processes. The invention preferably uses an autothermal reforming reactor (ATR). The latter typically operates at a temperature of between 400° C. and 1000° C. The pressure is traditionally between 100 and 4000 kPa. The ATR reactor contains one or more catalysts that are suitably selected by one skilled in the art. The invention may, however, very well be applied to a vapor-reforming reactor, wherein an endothermic reaction takes place. In this text below, the term reforming refers to either autothermal reforming or vapor reforming (also called reforming with vapor), or another type of reforming that is known to one skilled in the art.

The feedstocks that are introduced into the reforming reactor can first be heated. When the hydrocarbon feedstock is liquid, the latter can be evaporated by itself or with water and/or with water vapor before being injected into the reforming reactor in gaseous form. It is generally important not to have a two-phase mixture at the inlet of the reformer because this reduces the performance levels of the reactor. The water can also be evaporated by itself or with the air and/or with the hydrocarbon feedstock. At the inlet of the reformer, in general it is important that the temperature of the mixture remains less than the self-ignition temperature of the feedstock under the operating conditions.

The energy that is necessary for this evaporation and heating is taken at different points in the process by heat exchangers that are well-positioned and appropriately sized by one skilled in the art. The primary heat sources are the hot effluent that exits from the reformer and the residual combustion gases that are obtained from the start-up burner or residual gas burner. Preferably, to maximize the production of water vapor, the liquid hydrocarbon feedstock is evaporated with an amount of water that is as large as possible in using the heat of the effluent from the reformer. Certain other effluents, such as that of the reactor for converting carbon monoxide (WGS), if it is present, can be turned to good account. Overall, good thermal integration makes it possible to reach a quite high $H_2O/C$ molar ratio (preferably more than 2.7, more preferably more than 3.0, and even more preferably more than 4.0), which makes it possible to reach a good yield of hydrogen (preferably more than 55%, more preferably more than 60%, and even more preferably more than 64%), while maintaining the autothermal process, i.e., without the addition of outside energy.

The reformate, i.e., the stream that is obtained from the reforming reactor, is a synthesis gas. It is preferably treated by a section allowing to increase the content in hydrogen of the hydrogen containing gas or to reduce the carbon monoxide content in said gas, or both together.

This purification section can contain one or more conversion or separation units, such as for example those described in the field of invention part of this description.

Typically, a reactor for converting carbon monoxide into water (WGS) is the most used means. Several catalytic conversion zones can be used to reduce the level of carbon monoxide in the reformate. Whereby the reaction is exothermic, the effluent from the reactor for converting carbon monoxide into water is generally cooled by one or more exchangers, then the remaining water can be eliminated in a condenser. It is possible to use any other form of purification, such as, for example, a preferred oxidation (PrOx). In a preferred embodiment of this process, the purification section comprises a PSA system or a membrane filtration system. The unsuitable gases that are discharged by this purification section, referred to as purge gas or "off-gas" according to the English terminology, are burned in a gas burner.

This gas burner (referred to as "off-gas burner" according to the English terminology) is supplied with air by a blower. If the hydrogen production installation is coupled to a fuel cell, the exiting anodic gases can also be used as residual gases and burned in the burner of residual gases.

According to a preferred embodiment, the temperature of the effluents from the burner (flue gas), referred to as "flue gas" according to the English terminology, is controlled and regulated using an injection of cold air within the burner or at the burner exit. The hot effluents from the burner are used below to heat and/or to evaporate indirectly the hydrocarbon feedstock, the water and/or the air via heat exchangers.

B. Description of the Start-Up Procedure:

The start-up procedure primarily comprises four stages. The first stage (stage a) consists in starting a burner whose purpose is to ensure start-up, referred to as "start-up burner" according to the English terminology, which makes possible the indirect heating of a stream of air that enters the reforming reactor and is used to preheat it. The second stage (stage b) consists in evaporating the water by bringing it into contact with the hot streams of the process. The water vapor thus formed is introduced into the reforming reactor, which makes it possible to preheat it. The third stage (stage c) consists in starting up the reforming reactor, fed by heated hydrocarbon feedstock, water vapor and preferably air to obtain an autothermal operation. Finally, the last stage (stage d) consists in switching the supply of fuel and oxidizer from one burner to the next: the start-up burner is shut down, and the residual gas burner is activated. It is possible to use the same fuel or different ones to feed these two burners.

Prior to the start-up of the hydrogen production unit, it is necessary to ignite and start up the equipment that supplies reagents. The air compressors are started. In the case where, for example, the feedstock requires desulfurization, the desulfurization unit is to be heated, for example, by an electrical system. Likewise, in the case where the water that is used is demineralized, the demineralized water generator is started prior to the start-up of the entire unit.

The start-up depends on the state in which the unit is found initially. Thus, when, for example, the system also contains fuel that has not been removed since the last use, an uncontrolled combustion can occur during the addition of oxygen-rich gas. To avoid such phenomena, it is preferred to carry out a purging of the system before the start-up. In this case, the reforming reactor, the units for separation and purification, as well as the burners are purged with an inert gas, for example nitrogen, and regarding the burners, they can be purged with air, which is less costly.

The outlet of the purification section is connected to an air vent.

The reforming reactor is preferably pressurized by inert gas, for example nitrogen, at a pressure of between 30% and 60% (preferably between 40% and 50%) of the working pressure of the installation in permanent operation that is traditionally between 100 and 4000 kPa.

In stage a, a stream of gas that contains oxygen, which is preferably from the air, but that can also be pure oxygen or oxygen-enriched air, is sent into the start-up burner. The hydrocarbon feedstock is added. When the latter is liquid, the start-up burner has a suitable technology for the combustion of a liquid feedstock. It is then, for example, equipped with a spraying system. To initiate the combustion, for example, an electrode that is charged is used. According to a preferred embodiment, a stream of air is sent into the outlet of the burner or within the jacket of the burner to control the temperature of the effluents to be burned, so as to dilute the gases that are too hot and that can damage the material of the pipes that are located downstream from the burner. Via heat exchangers, the effluent gases of the start-up burner heat a stream of inert gas or oxygen-rich gas, preferably air, which may or may not be the same as that used for the reforming. This gas is sent into the reformer and the purification section preferably at a flow rate with a value of 50% to 80% (more preferably 60% to 70%) of the value of the flow rate of the installation in permanent operation. This system is preferably maintained until the temperature of the start-up burner effluent is generally more than 600° C., preferably between 625° C. and 800° C., and until the temperature of the gas that is exiting from the reformer is generally more than 200° C., preferably more than 250° C., and even more preferably between 300° C. and 500° C.

When these conditions are met, the hot gases of the process are employed in stage b to evaporate, and even to superheat, the water that is bound for the reforming reaction. For this purpose, before entering the reforming reactor, the water stream circulates in one or more heat exchangers that are in contact with at least one hot stream of the process, which is selected from among the following streams: the hot stream that exits the burner, the hot stream that exits the reformer, and the stream that exits any other unit whose effluent is hot, such as, for example, a reactor for converting carbon monoxide. This water circulation is maintained until the temperature at the outlet of all the exchangers is adequate to ensure that the water is entirely evaporated. For example, this condition is met if the temperature at the outlet of all of the exchangers is more than 150° C. (preferably between 180° C. and 250° C.) when the operating pressure is 500 kPa, more than 180° C. (preferably between 200° C. and 280° C.) when the operating pressure is 1000 kPa, and more than 250° C. (preferably between 280° C. and 300° C.) when the operating pressure is 4000 kPa. Preferably, the reforming reactor is preheated by the inert gas or the oxygen-rich gas, and the evaporated water stream. The flow rate of this water stream is increased up to its value of permanent operation, then this water circulation is maintained until the temperature at the outlet of all the exchangers is more than 150° C. (preferably between 180° C. and 250° C.) if the operating pressure is 500 kPa, more than 180° C. (preferably between 200° C. and 280° C.) if the operating pressure is 1000 kPa, and more than 250° C. (preferably between 80° C. and 300° C.) if the operating pressure is 4000 kPa, to ensure that the water is totally evaporated. In contrast, the temperature of the stream that is obtained from the reforming reactor should reach at least 300° C., more preferably it should be more than 350° C., and even more preferably between 375° C. and 800° C.

When these conditions are met, the reforming reactor is activated. However, if the gas that is used for the preheating is rich in oxygen, it is very preferable to carry out a purging stage of the reactor at this time. This makes it possible to avoid the coking of the hydrocarbon feedstock on the hot catalyst. The stream of air or oxygen-rich gas that circulates in the reformer is shut down, and an inert gas, for example nitrogen, is sent. The purging may also be carried out by means of a water vapor stream without oxygen at low temperature (for example from 10° C. to 200° C.). In any case, the purging should not be too long and/or the gas that is used for this purging should not be too cold to prevent the cooling of the catalyst.

Once the purging is carried out, the reforming is carried out in stage c by injecting the hydrocarbon feedstock into the reforming reactor. The stream is regulated so that the flow rate is either preferably between 15% and 50% (preferably between 20% and 30%) of the flow rate that is imposed in permanent operation. The hydrocarbon feedstock is first heated when it is a matter of a gaseous feedstock, or evaporated and preferably superheated when it is a liquid feedstock, by indirect heat exchange with at least one hot stream of the process, which is selected from among the following streams: the hot stream that exits the burner, the hot stream that exits the reformer, and the stream that exits any other unit whose effluent is hot, such as, for example, a reactor for converting carbon monoxide. Preferably, the hot stream that exits the reformer is used. The hydrocarbon feedstock can also be mixed with water vapor or liquid water. However, it is preferable that the temperature of the reaction mixture not exceed its self-ignition temperature before entering the reformer. According to a preferred method of operation, the stream of air or oxygen-rich gas previously stopped for the purging is reinjected into the mixture with the water vapor and the hydrocarbon feedstock so that the reforming is autothermal. This circulation of the streams is maintained until the temperature at the outlet of the reformer is preferably more than 300° C., more preferably more than 350° C., and even more preferably between 375° C. and 800° C. When the operating conditions are stabilized, the latter are preferably maintained between 5 and 15 minutes.

The functioning of the permanent operation of the generator is obtained when the supply of heat necessary to the preferably autothermal operation of the reformer is no longer due to the combustion of the hydrocarbon feedstock but to that of residual gases that are low in hydrogen, obtained during operations of the section for purification of reformed gas. This recycling makes it possible to conserve raw materials, therefore to obtain better energy yields in the process for reforming the hydrocarbon feedstock into hydrogen, while retaining a high performance level. The residual gas burner has the technology that is suitable for gas combustion, preferably a catalytic burner for limiting the emissions of polluting compounds such as nitrogen oxides.

Thus, according to one embodiment of the process according to the invention, at step c a stream of hydrocarbon feedstock is sent to a heat exchanger, where said feedstock is vaporized when liquid or heated when gaseous through indirect exchange with at least one hot stream of the process, then said feedstock enters the reformer. The feedstock stream is preferably regulated so that the flow rate is between 15% and 50% of the flow rate that is imposed in permanent operation, this circulation of stream is maintained until the temperature at the outlet of the reformer is preferably more than 300° C.

The transfer of the combustion of the start-up burner to the residual gas burner is carried out in the fourth stage (stage d). One solution consists in shutting down the start-up burner, transferring the streams of air or oxygen-rich gas that are used in the combustion and the dilution of the hot effluents toward the burner of residual gases, then setting the ignition electrodes of the residual gas burner, and finally entering the effluents from the purification section into the residual gas burner.

Preferably, there are less than 30 seconds, and even more preferably between 2 seconds and 10 seconds, of waiting time between the shutdown of the start-up burner and the start-up of the residual gas burner so as to prevent the cooling of the entire hydrogen production unit. This waiting period, however, can be put to good use for carrying out a flushing of air or an inert gas, such as for example nitrogen, in the start-up burner, which makes it possible to prevent corrosion due to the acidic water that is obtained from the combustion.

Another solution consists in first lighting the residual gas burner by supplying it with a flow of air or oxygen-rich gas, by arming the ignition electrodes and entering the gases that exit from the purification section. Then, the start-up burner is quickly extinguished, and the purging of the start-up burner can be carried out.

According to this variant, it is preferred to use independent oxygen-rich gaseous streams. After the start-up of the burner of the residual gas, the flow rates of water and hydrocarbon feedstock can be increased gradually up to the fixed flow rate in permanent operation.

The purification section preferably makes it possible to separate the residual gases that are sent to the residual gas burner from the hydrogen-rich gas. Before the start-up of the residual gas burner, the purification section is connected to an air vent. After the start-up of the residual gas burner and as soon as the start-up burner is stopped, the entire synthesis gas that is produced is sent into the residual gas burner. According to this implementation of the invention, when the purification unit is activated, the synthesis gas is purified, the hydrogen-rich gas that is produced is drawn off, and it is the purge gas that supplies the residual gas burner. According to the level of purity desired, the purification section comprises one or more units of a technology that is known to one skilled in the art. These units are activated before or after stage d according to their technology. For example, some are heated, others are purged, for example by an inert gas. The start-up process according to the invention makes it possible to produce quickly a hydrogen stream at the outlet of the purification section whose specifications are tailored to the requirements of the user.

Preferred Variant Embodiment of the Invention

According to the references of FIG. 1, the hydrogen production unit 1 comprises, according to this example, a reforming reactor 2, a burner 3 whose purpose is to ensure start-up, a burner 4 that is in permanent operation, a purification section 5, and two heat exchange systems 6 and 7.

Before start-up, the unit 1 is charged electrically. The systems for desulfurizing the hydrocarbon feedstock and demineralizing the water, not shown here, are ready. The air compressors 15, 19 and 23 are started.

Preferably, a purging of the system is carried out. For this purpose, a stream of air or of inert gas, for example nitrogen, is loaded via the line 14, enters the residual gas burner 4 via the line 17 and the start-up burner 3 via the line 16, then the heat exchanger 6 via the line 25 or the line 26, and escapes to the air vent via the line 27. A stream of inert gas, preferably nitrogen, is loaded via the line 22, passes through the heat exchanger 6, and enters the reforming reactor 2 via the line 28. The flow rate is maintained so that the pressure inside the reformer 2 reaches approximately 40% of the working pressure of the installation in permanent operation. The valve 36 is closed, and the valve 44 is opened so that the effluents from the separation/purification section 5 escape via the pipe 32 to the air vent.

During stage a of the start-up process, a stream of air is injected into the start-up burner 3 via the inlet 14, the compressor 15 and the line 16. A second stream of air, which is used to dilute the hot effluents from the burner, is sent to the outlet of the start-up burner 3 via the inlet 18, the compressor 19 and the line 20. A third stream of air is sent into the exchanger 6 via the inlet 22, the compressor 23 and the line 24. The flow rate of this third stream of air has a value of 50% to 80% (more preferably 60% to 70%) of the value of the flow rate of the installation in permanent operation when the chemical process that is selected is an autothermal reforming. The hydrocarbon feedstock is injected into the start-up burner 3 via the inlet 8 and the line 9, and a spark ignites the fuel. The hot effluents that are obtained from this combustion exit via the line 25 and heat the air that is coming in via the line 24 in the heat exchanger 6. Said air, now hot, enters the reforming reactor 2 via the line 28 and exits therefrom via the line 30. It then enters the heat exchange system 7 and then the purification section 5 via the line 31, and exits to the air vent via the line 32. These operating conditions are maintained until the temperature of the air stream in the line 30 is more than 200° C.

During the stage b of the start-up process, a water stream that enters via the line 11 is injected into the exchanger 6 via the line 13 and into the exchanger 7 via the line 12. According to other embodiments, the water can also be injected into other heat exchangers at different points of the process. The water vapor that was produced rejoins the reforming reactor 2 via the lines 28 and 29. The water stream, all of which enters the reformer 2, is regulated so that the flow rate is between 15% and 50% (preferably between 20% and 30%) of the flow rate that is imposed in permanent operation. This water circulation is maintained until the water is entirely evaporated at the outlet of the exchangers 6 and 7. Its flow rate is then increased up to its value in permanent operation and the water circulation is maintained again until the water is entirely evaporated at the outlet of exchangers 6 and 7, and, in contrast, until the temperature of the air stream in the line 30 is more than 300° C.

At the end of stage b and before stage c, inerting of the reforming reactor can be carried out. For this purpose, the air stream entering via the line 22 and coming in via line 24 is replaced by a flow of inert gas under these conditions, which may be nitrogen or water vapor without molecular oxygen at low temperature (10° C. to 200° C., for example).

In stage c of the start-up process, a stream of hydrocarbon feedstock that enters at 8 is sent into the line 10. The feedstock evaporates when it is liquid or heats when it is gaseous by passing through the heat exchanger 7, then enters the reforming reactor 2 via the line 29. The hydrocarbon feedstock stream is adjusted so that the flow rate is between 15% and 50% (preferably between 20% and 30%) of the flow rate that is imposed in permanent operation. This circulation of the streams is maintained until the temperature at the outlet of the reformer is more than 300° C., preferably more than 350° C., even more preferably between 375° C. and 800° C.

During the stage d of the start-up process, the electrodes for igniting the residual gas burner 4 are charged electrically. The start-up burner 3 is shut down, the valves 34 and 35 are directed so that the air streams that are obtained from compressors 15 and 19 are directed toward the residual gas burner, the valve 36 is open—making it possible for effluents from the purification section 5 to reach the residual gas burner via the line 33.

The combustion begins immediately. The hydrocarbon feedstock flow rate is then gradually increased to reach the value of the flow rate imposed in permanent operation. When the permanent flow rate is reached and the synthesis gas composition is stabilized, the purification section 5 is activated. The valve 44 is open to allow the hydrogen-rich gas that is produced to exit via the line 32; the purge gases of the purification section 5 are injected into the burner 4 via the line 33.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A start-up process for a thermally-integrated hydrogen production unit that comprises:
   (a) supplying a start-up burner whose purpose is to ensure start-up of the unit with a mixture of hydrocarbon feedstock and air, burning said mixture, and heating with hot effluents that are obtained from said burner a gaseous stream that enters a reforming reactor and that exits therefrom, until the temperature of the stream that is obtained from said reforming reactor reaches a value of more than 200° C.,
   (b) after (a) evaporating a stream of water by indirect heat exchange with at least one hot stream from the process, generating a stream of water vapor that enters said reforming reactor until the stream that is obtained from this reactor reaches a temperature of more than 300° C. and all of the water is evaporated,
   (c) after (b) evaporating liquid hydrocarbon feedstock that is to be reformed or heating gaseous feedstock to be reformed, by indirect heat exchange with at least one of the hot streams of the process; introducing said feedstock into the reforming reactor, enabling the production of a hydrogen-rich effluent stream,
   (d) after (c) replacing the start-up burner with a burner that is in permanent operation, supplied by a mixture of residual air and gas discharged by a section for purification of the hydrogen-rich stream, wherein effluent obtained from the reforming reactor enters and then leaves from a reactor converting carbon monoxide with water (WGS), positioned downstream from said reforming reactor, during all the stages of the start-up process.

2. The start-up process according to claim 1, wherein the reforming reactor is inerted between (b) and (c) by purging the reforming reactor with an inert gas.

3. The start-up process according to claim 1, wherein at least one of the reforming reactor, the start-up burner, the burner in permanent operation or, the purification section is purged before the start-up process.

4. The start-up process according to claim 1, wherein the hydrocarbon feedstock is liquid.

5. The start-up process according to claim 1, wherein the hydrocarbon feedstock is heated when it is a gaseous feedstock, or evaporated when a liquid feedstock is used, before entering the reforming reactor, by indirect heat exchange with the hot stream that exits the reforming reactor.

6. The start-up process according to claim 1, wherein at the end of (c) and before (d) stabilized operating conditions of the installation are maintained between 5 and 15 minutes.

7. The start-up process according to claim 1, wherein there are less than 30 seconds of waiting time between shutdown of the start-up burner and lighting of the burner in permanent operation during (d).

8. The start-up process according to claim 7, wherein flushing with air is carried out in the start-up burner during the waiting time between shutdown of the start-up burner and lighting of the burner in permanent operation in (d).

9. The start-up process according to claim 1, wherein an air flow is sent to the outlet of the start-up burner and the burner in permanent operation to control the temperature of effluents from these burners.

10. The start-up process according to claim 1, wherein (c) a stream of hydrocarbon feedstock is sent to a heat exchanger where said feedstock is vaporized when liquid or heated when gaseous through indirect exchange with at least one hot stream of the process, then said feedstock enters the reformer, the feedstock stream being optionally regulated so that the flow rate is between 15% and 50% of the flow rate that is imposed in permanent operation, and circulation of stream is maintained until the temperature at the outlet of the reformer is more than 300° C.

11. The start-up process according to claim 1, wherein transfer of combustion of the start-up burner to the burner in permanent operation is carried out in (d) by shutting down the start-up burner, transferring the streams of air or oxygen-rich gas that are used in the combustion and the dilution of the hot effluents toward the burner in permanent operation, then setting ignition electrodes of the burner in permanent operation, and finally entering the effluents from the purification section into the burner in permanent operation.

12. The start-up process according to claim 11, wherein there are less than 30 seconds of waiting time between shutdown of the start-up burner and start-up of the burner in permanent operation so as to prevent the cooling of the entire hydrogen production unit, and during the waiting time flushing of air or an inert gas in the start-up burner.

13. The start-up process according to claim 1, wherein the transfer of combustion of the start-up burner to the burner in permanent operation is carried out in (d) by first lighting burner in permanent operation by supplying it with a flow of air or oxygen-rich gas, by arming its ignition electrodes and introducing gases that exit from the purification section, quickly extinguishing the start-up burner, and purging of the start-up burner.

* * * * *